United States Patent [19]
Tichelaar et al.

[11] Patent Number: 5,627,592
[45] Date of Patent: May 6, 1997

[54] START CODE FOR SIGNALLING BITS

[75] Inventors: Johannes Y. Tichelaar, Eindhoven; Franciscus H. M. Bergen, Best, both of Netherlands; Philippe A. M. Van Overmeire, Ghent, Belgium; Jilles Ultee, Hapert, Netherlands

[73] Assignee: U.S. Philips Corporation, New York, N.Y.

[21] Appl. No.: 618,942

[22] Filed: Mar. 13, 1996

Related U.S. Application Data

[63] Continuation-in-part of Ser. No. 15,192, Feb. 10, 1993, Pat. No. 5,323,236, which is a continuation of Ser. No. 373,184, Jan. 17, 1995.

[30] Foreign Application Priority Data

Jan. 17, 1995 [EP] European Pat. Off. .............. 93201514

[51] Int. Cl.⁶ .................................................. H04N 7/015
[52] U.S. Cl. ................................. 348/429; 348/474
[58] Field of Search ................................. 348/426, 460, 348/486, 473–475, 429; 370/48, 49, 76, 110.01; 375/369

[56] References Cited

U.S. PATENT DOCUMENTS

| | | | |
|---|---|---|---|
| 4,701,939 | 10/1987 | Stutt et al. ........................... | 375/115 |
| 4,888,641 | 12/1989 | Isnardi et al. ....................... | 358/141 |
| 4,912,549 | 3/1990 | Altman et al. ....................... | 348/496 |
| 4,943,847 | 7/1990 | Katznalson .......................... | 348/487 |
| 5,301,023 | 4/1994 | Zato .................................... | 348/473 |
| 5,323,236 | 6/1994 | Tichelaar et al. .................. | 348/469 |

FOREIGN PATENT DOCUMENTS 4112712  10/1992  Germany.

*Primary Examiner*—Victor R. Kostak
*Attorney, Agent, or Firm*—Edward W. Goodman

[57] ABSTRACT

In an extended television signal having signalling bits for conveying control information to control an extended decoder, the signalling bits include a start code and data bits. The start code's main lobe of spectral energy resides in the lower spectral area of a baseband television signal below 2 MHz and preferably below 1.7 MHz. The start code is preferably (almost) DC-free, and the start code has good aperiodic correlation properties and a predetermined minimum bit Hamming distance to the data bits when shifted in the direction of the data bits following the start code.

26 Claims, 11 Drawing Sheets

| group 1<br>Aspect Ratio | group 2<br>Enhanced Services | group 3<br>Subtitles | group 4<br>Reserved |
|---|---|---|---|
| 24 elements<br>based on 5 MHz | 24 elements<br>based on 5 MHz | 18 elements<br>based on 5 MHz | 18 elements<br>based on 5 MHz |
| bit numbering<br>0 1 2 3<br>LSB   MSB<br>per info bit:<br>'0' = 000 111<br>'1' = 111 000 | bit numbering<br>4 5 6 7<br>LSB   MSB<br>per info bit:<br>'0' = 000 111<br>'1' = 111 000 | bit numbering<br>8 9 10<br>LSB   MSB<br>per info bit:<br>'0' = 000 111<br>'1' = 111 000 | bit numbering<br>11 12 13<br>LSB   MSB<br>per info bit:<br>'0' = 000 111<br>'1' = 111 000 |

| 3210 | bit number |
|---|---|
| 1000 | full format 4:3 |
| 0001 | box 14:9 Center |
| 0010 | box 14:9 Top |
| 1011 | box 16:9 Center |
| 0100 | box 16:9 Top |
| 1101 | box >16:9 Center |
| 1110 | full format 14:9 Center<br>shoot and protect 14:9 |
| 0111 | full format 16:9 |

$b_3$ = Odd Parity Bit

| 4 | bit number |
|---|---|
| 0 | Camera mode |
| 1 | Film mode |

$b_5$ = Reserved. Should be set to '0'
$b_6$ = Reserved. Should be set to '0'
$b_7$ = Reserved. Should be set to '0'

| 8 | bit number |
|---|---|
| 0 | no subtitles within Teletext |
| 1 | subtitles within Teletext |

| 10 9 | bit number |
|---|---|
| 0 0 | no open subtitles |
| 0 1 | subtitles in active image area |
| 1 0 | subtitles out of act. image area |
| 1 1 | reserved |

Reserved.
Should all be set to '0'

POWER SPECTRAL DENSITY VS. FREQUENCY

| group 1 | group 2 |
|---|---|
| Aspect Ratio | Enhanced Services |
| 24 elements based on 5 MHz | 24 elements based on 5 MHz |
| bit numbering<br>0 1 2 3<br>LSB    MSB<br><br>per info bit:<br>'0' = 000 111<br>'1' = 111 000    ① | bit numbering<br>4 5 6 7<br>LSB    MSB<br><br>per info bit:<br>'0' = 000 111<br>'1' = 111 000    ① |

| 3210 | bit number | 4 | bit number |
|---|---|---|---|
| 1000 | full format 4:3 | 0 | Camera mode |
| 0001 | box 14:9 Center | 1 | Film mode |
| 0010 | box 14:9 Top | | |
| 1011 | box 16:9 Center | | |
| 0100 | box 16:9 Top | | $b_5$ = Reserved. Should be set to '0' |
| 1101 | box >16:9 Center | | |
| 1110 | full format 14:9 Center shoot and protect 14:9 | | $b_6$ = Reserved. Should be set to '0' |
| 0111 | full format 16:9 | | $b_7$ = Reserved. Should be set to '0' |

$b_3$ = Odd Parity Bit

FIG. 11b

| group 3 Subtitles | group 4 Reserved |
|---|---|
| 18 elements based on 5 MHz | 18 elements based on 5 MHz |
| bit numbering<br>8  9  10<br>LSB     MSB<br>per info bit:<br>'0' = 000 111<br>'1' = 111 000   ① | bit numbering<br>11  12  13<br>LSB     MSB<br>per info bit:<br>'0' = 000 111<br>'1' = 111 000   ① |
| 8 \| bit number<br>0 \| no subtitles within Teletext<br>1 \| subtitles within Teletext<br><br>10 9 \| bit number<br>0 0 \| no open subtitles<br>0 1 \| subtitles in active image area<br>1 0 \| subtitles out of act. image area<br>1 1 \| reserved | Reserved.<br>Should all be set to '0' |

FIG. 11c

START CODE FOR SIGNALLING BITS

CROSS-REFERENCE TO RELATED APPLICATIONS

This is a continuation-in-part application of U.S. patent application Ser. No. 08/015,192, filed Feb. 10, 1993, now U.S. Pat. No. 5,323,236, which is a continuation of application Ser. No. 08/373,184, filed Jan. 17, 1995.

BACKGROUND OF THE INVENTION

1. Field of the Invention

The invention relates to a extended television signal comprising signalling bits for conveying control information to control an extended decoder.

2. Description of the Related Art

Such an extended television signal has been described in the German patent application DE-A-41.12.712. This prior art document discloses a signalling bits signal comprising run-in information data, start information data, and useful information data. The run-in information data comprises eight sine oscillations for synchronizing a phase-locked loop. The start information data serves for addressing the useful information data and for catching the start of the useful information data. As soon as the receiver determines the presence of recognition data in the input signal, the receiver is able to process the useful information data with the correct phase. No further details with regard to the start information data are given. The useful information data are, for example, bi-phase coded. The signal is DC-free to facilitate magnetic recording.

SUMMARY OF THE INVENTION

It is, inter alia, an object of the invention to provide an extended television signal having signalling bits which are reliably decodable under severe circumstances. To this end, one aspect of the invention provides an extended television signal comprising signalling bits for conveying control information to control an extended decoder, the signalling bits comprising a start code and data bits, wherein the start code's main lobe of spectral energy resides in the lower spectral area of a baseband television signal, said lower spectral area having a maximum frequency below 2 MHz, which maximum frequency is preferably 1.7 MHz, the start code having an amplitude dip at zero frequency, and the start code having good aperiodic correlation properties and a predetermined minimum bit Hamming distance to the data bits when shifted in the direction of the data bits following the start code. A second aspect of the invention provides an extended television signal decoder comprising means coupled to receive an extended television signal (CVBS) comprising image data, signalling bits for conveying control information to control processing operations with regard to said image data, and synchronizing information (VCS), for deriving said synchronizing information (VCS) from said extended television signal (CVBS); means coupled to receive said synchronizing information (VCS) for selecting a signalling bits window; means coupled to receive said extended television signal for decoding said signalling bits during said signalling bits window; wherein the signalling bits comprise a start code and data bits, the start code's main lobe of spectral energy resides in the lower spectral area of a baseband television signal, said lower spectral area having a maximum frequency below 2 MHz and which maximum frequency is preferably 1.7 MHz, the start code having a local spectral minimum at DC, and the start code having good aperiodic correlation properties and a predetermined minimum bit Hamming distance to the data bits when shifted towards or over the data bits following the start code. A third aspect of the invention provides a method of decoding an extended comprising the steps of receiving an extended television signal (CVBS) comprising image data, signalling bits for conveying control information to control processing operations with regard to said image data, and synchronizing information (VCS), for deriving said synchronizing information (VCS) from said extended television signal (CVBS); selecting (7) a signalling bits window in dependence on said synchronizing information (VCS); decoding said signalling bits during said signalling bits window in response to said extended television signal (CVBS); wherein the signalling bits comprising a start code and data bits, the start code's main lobe of spectral energy resides in the lower spectral area of a baseband television signal, said lower spectral area having a maximum frequency below 2 MHz and which maximum frequency is preferably 1.7 MHz, the start code having a local spectral minimum at DC, and the start code having good aperiodic correlation properties and a predetermined minimum bit Hamming distance to the data bits when shifted towards or over the data bits following the start code.

The extended television signal in accordance with the invention comprises signalling bits for conveying control information to control an extended decoder, wherein the signalling bits comprise a start code and data bits. The start code's main lobe of spectral energy resides in the lower spectral area of a baseband television signal below 2 MHz, and preferably below 1.7 MHz. The start code is preferably (almost) DC-free, and the start code has good aperiodic correlation properties and a predetermined minimum bit Hamming distance (in number of bit coincidences) to the data bits when shifted towards or over the data bits following the start code.

The start code selected according to the these criteria appears to yield a very reliable decodable extended television signal even under severe circumstances. It is to be noted that the expressions (almost) DC-free or a spectral minimum at zero frequency do not necessarily imply that the signalling bits or its start code part are centered around a zero voltage level; the signalling bits may have a voltage offset. Aperiodic correlation is another expression for autocorrelation, as explained on page 346 of R. E. Ziemer and W. H. Tranter, Principles of Communications, systems, modulation, and noise, Houghton Mifflin Company, Boston U.S.A., 2nd edition 1976. In the context of this application, a code can be said to have good aperiodic correlation properties when the autocorrelation of the code, normalized to a global maximum of one at zero delay, shows a difference of at least one-half between the global maximum and any local maxima. It appeared to be sufficient if the predetermined minimum bit Hamming distance of the start code to the data bits is one, while a preferred minimum bit Hamming distance of the start code to the data bits is three.

These and other aspects of the invention will be apparent from and elucidated with reference to the embodiments described hereinafter.

DESCRIPTION OF THE PREFERRED EMBODIMENTS

The Proposal for Wide Screen Signalling Bits (below), which forms an integral part of the present disclosure, describes a proposal for standardization of transmitting signalling information to a TV receiver. This signalling information contains the aspect ratio, some enhanced services, subtitles, etc. The proposal is developed for broadcasting (terrestrial, satellite, cable etc.) only, as well as for such broadcasting in combination with VCR's. Even under the condition of the replay of a copy of a VCR recording of the broadcasted signalling bits, the signalling bits should be reliably decodable. To meet the requirement that the signalling bits are reliably decodable under such severe conditions (VCR's), one aspect of the invention provides that the main spectral energy of the signalling bits resides in the lower spectral area of baseband video, below 2 MHz and preferably below 1.7 MHz. This frequency constraint can be met by the requirement that at a 5 MHz sample rate, at least three successive channel bits should each time be equal to each other. On the other hand, it appeared that making a higher number of successive channel bits each time equal to each other yields little improvement in detection reliability but, of course, restricts the number of transferable bits.

It is noted that this upper frequency limitation requirement differs substantially from the characteristics of, for example, teletext and Video Program System (VPS) signals. Both prior art signal spectra have frequencies up to 5 MHz, a main lobe of the VPS spectrum being at about 2.5 MHz which is believed to be far too high for the signalling bits start code.

The signalling bits include a start code and data bits, preferably preceded by a run-in. The invention is based on the recognition that to meet the object of the invention, i.e., to obtain very reliably decodable signalling bits, the start code should have the following characteristics:

1. The start code's main lobe of spectral energy should reside in the lower spectral area of baseband video (which is also required for the data bits) below 2 MHz. Eg., this lower spectral area is about 0–1.7 MHz. Further, the start code should preferably have a local spectral minimum at DC.

2. The start code should have good aperiodic correlation properties.

3. The start code should have some minimum distance (in number of bit coincidences) when shifted over the data bits transmitted directly after the start code. This could be implemented by coding the start code slightly different from the bi-phase modulation code of the data bits (see the Proposal for Wide Screen Signalling bits below).

Figure 1:
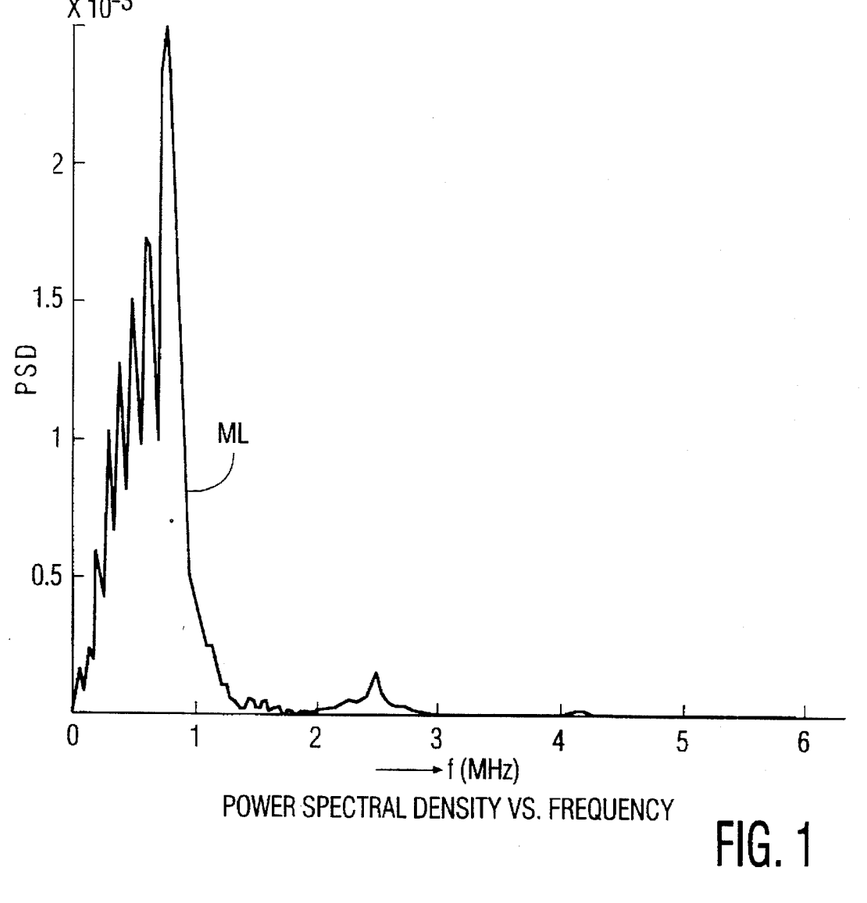
FIG. 1 shows a preferred power spectral density (PSD) of the signalling bits.

Items 1 (no high frequencies) and 2 (good autocorrelation properties) are in practice, difficult to combine. A good compromise has been found, in which the start code has a frequency peak at about 900 kHz and a main lobe ML of spectral energy in a frequency area below 1.7 MHz, above which only about 6% of the signal energy is present, see the power spectral density versus frequency graph of FIG. 1. As shown in FIG. 1, the Wide Screen Signalling (WSS) bits preferably have a spectral minimum at about 1.7 MHz to reduce group delay distortions and disadvantages caused by amplitude attenuations which may exceed 27 dB occurring at the maximum frequency (2–2.5 MHz) which VHS video recorders allow to pass when a copy is made of an already recorded original.

The extended television signal provides an enhanced detection reliability. In case of an undisturbed signal, a minimum bit Hamming distance of the start code to the run-in of one is sufficient, while a preferred minimum bit Hamming distance of the start code to the run-in is six.

Figure 2:
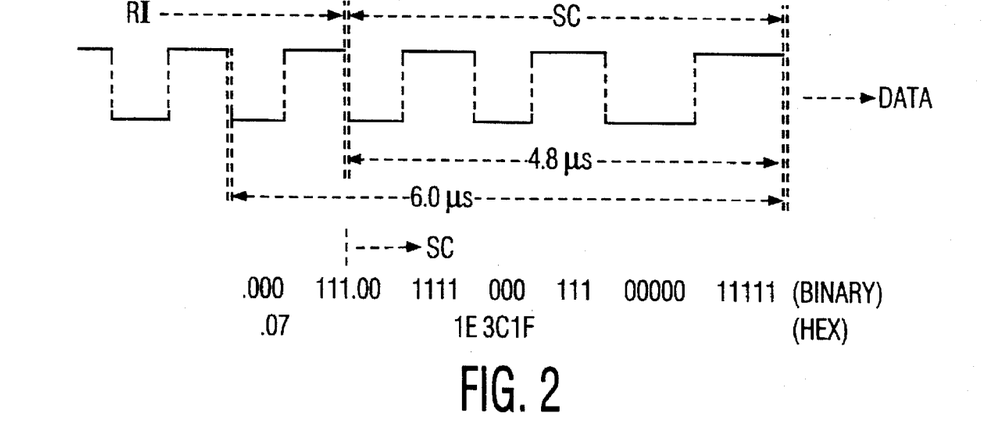
FIG. 2 shows the last part of the run-in, and the start code.

In FIG. 2, one example of the last part of the run-in RI as well as the start code SC is presented. In accordance with an embodiment of the present invention, the start code is based on inverted Barker codes (see R. E. Ziemer and W. H. Tranter, Principles of Communications, systems, modulation, and noise, Houghton Mifflin Company, Boston U.S.A.; 2nd edition 1976) of length 4 and 5, in order to meet the second characteristic.

As listed in Ziemer and Tranter, page 346, the following Barker sequences are known:

| | |
|---|---|
| B2: | 1 0 |
| B3: | 1 1 0 |
| B4: | 1 1 0 1 |
| B5: | 1 1 1 0 1 |
| B7: | 1 1 1 0 0 1 0 |
| B11: | 1 1 1 0 0 0 1 0 0 1 0 |
| B13: | 1 1 1 1 1 0 0 1 1 0 1 0 1 |

The inverted bit sequences (0 and 1 interchanged), the reversed bit sequences (the above sequences when read from right to left), and the bit sequences which are both inverted and reversed are also appropriate.

As an alternative to Barker codes, pseudo-noise codes and digital sequences derived from Hadamard matrices (also mentioned in Ziemer and Tranter) can be used.

The inverted Barker code of length 4 is [0010] and of length 5 [00010]. The embodiment shown is based on the recognition that the Barker code of length 4 (B4) is a subset of the Barker code of length 5 (B5). (Similarly, the Barker sequence of lengths 2, 3 and 4 are subsets of the Barker sequences of lengths 3, 4 and inverted 7, respectively.) The inverted Barker code has been convolved with a kind of bi-phase modulation code in order to meet the first characteristic, as shown below:

| |
|---|
| [1] ---> [1 1 1 0 0 0] |
| [0] ---> [0 0 0 1 1 1]. |

After this modulation coding, the result looks like the following:

| | |
|---|---|
| Inverted B4 mod. coded: | [000111 000111 111000 000111] |
| Inverted B5 mod. coded: | [000111 000111 000111 111000 000111] |

The start code given in FIG. 2, is based on the inverted Barker length 4 code. If this start code is extended by the last 6 bits of the run-in (see FIG. 2), then it can be extended to the inverted Barker code of length 5. In order to meet the third characteristic, small changes are introduced to the (kind of) bi-phase modulated inverted Barker sequences. The final result is given by:

| | |
|---|---|
| Barker 4 based: | [0001 1110 0011 1100 0001 1111] |
| Barker 5 based: | [00 0111 0001 1110 0011 1100 0001 1111] |

The Barker 4 based start code gives an overall minimum bit Hamming distance 3, and a minimum bit Hamming distance 6 to the run-in and the start code only. The Barker 5 based start code gives an overall minimum bit Hamming distance 5, and a minimum bit Hamming distance 8 to the run-in and start code only. By selecting nested Barker sequences in accordance with the present embodiment of the invention, it becomes possible to provide decoders which do not just use the start code, but which rely on the combination of the start code and the tail of the run-in, and which thus are able to benefit from the increased bit Hamming distances and increased detection reliability associated with the longer, Barker 5 sequence.

In order to make sure that a phase locked loop (PLL) can obtain acquisition from and lock to the run-in, the run-in should have at least 8 transients. The following run-in resulted:

| | |
|---|---|
| 1 1111 0001 1100 0111 0001 1100 0111 | (binary) |
| 1F1C 71C7 | (hex) |

THE WSS DECODER

Figure 3:
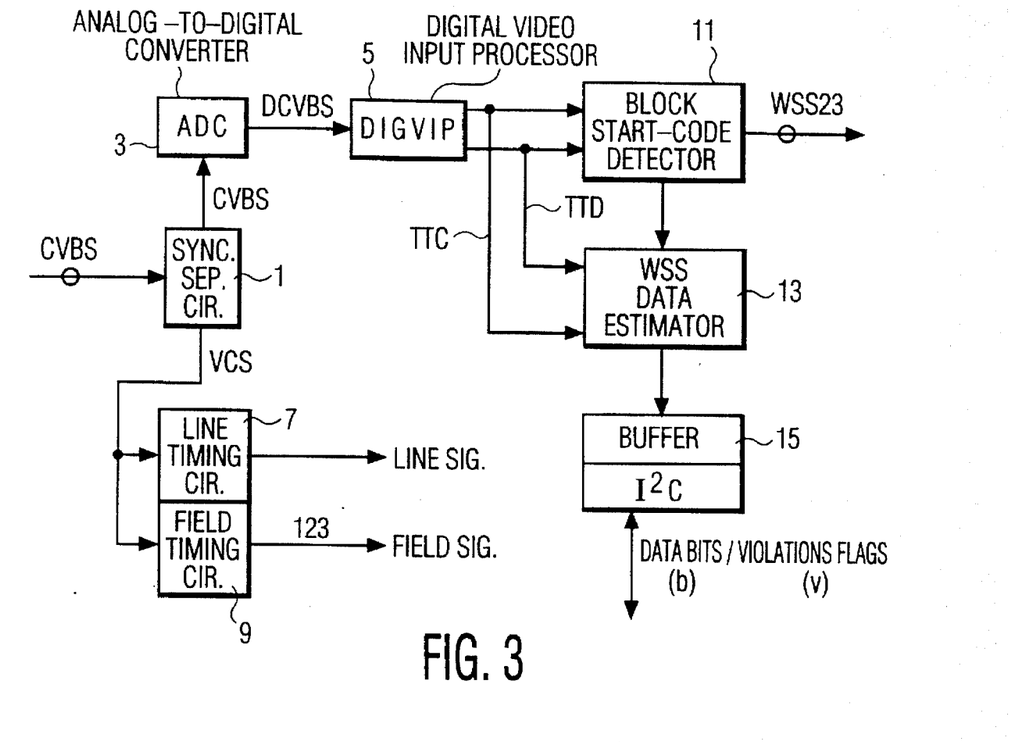
FIG. 3–5 show embodiments of a wide screen signalling bits decoder.

In FIG. 3, a scheme is presented which shows the basic blocks of the Wide Screen Signalling (WSS) decoder. This circuitry shown is part of a device which is used for decoding of several data processes in a television signal, like teletext, VPS, etc. Within the context of this application, we concentrate on WSS.

The composite video baseband signal (CVBS) is fed into a (state of the art) input clamp and sync separator circuit 1. The sync separator 1 slices the composite video to give a separate video composite sync (VCS) for line timing and field timing. The clamped CVBS is applied to a video analog-to-digital converter (ADC) 3 which outputs digital CVBS (DCVBS) at a sample frequency of 13.5 MHz. The DCVBS is applied to a digital video input processor (DIGVIP) 5. This DIGVIP 5 includes a state of the an adaptive clock regenerator circuit which exists of a combination of an adaptive slicer, a digital phase lock loop (DPLL) and sampler. The DPLL locks on the data input signal with a sample frequency of 5 MHz (in the case of WSS in line 23!). The output of the DIGVIP 5 carries hard decoded estimates of the 5 MHz grid data samples. This DIGVIP output has been realized by two output lines: TTD and TTC. TTD carries a binary data stream with a clock frequency of 13.5 MHz. TTC is a data clock line with a clock frequency of 13.5 MHz. TTC determines with a low to high transient that a corresponding TTD sample is a valid sample. Hence, in the case of WSS, almost every second sample of TTD is a valid sample.

The line timing circuit 7 and field timing circuit 9 generate timing windows for wide screen signalling in line 23. The occurrence (123) of line 23 is signalled to the DIGVIP 5 so that it can switch the DPLL's discrete time oscillator (DTO) to 5 MHz. A timing window is generated for the run-in and the head of the start-code of WSS. The gain of the PLL loop is lowered when this window is active in order to obtain fast acquisition and lock. A start-code timing window is generated to enable the start-code detection process. This start-code timing window should have a timing tolerance of at least ±4 µs. This tolerance, which has been determined by practice, is absolutely necessary in the case that a VCR signal is input. The explanation is that the VCR's head switch introduces a residual timing error in line 23. This timing error is even worse when a tape exchange has occurred or when the VCR is replaying a copy tape with WSS.

Figure 11:
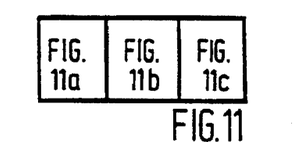
FIGS. 11, 11a–11c show a wide screen signalling bits transmission scheme table.

The output lines TTD and TTC of DIGVIP 5 are applied to a block start-code detector 11. This block will be explained in detail below. If the start-code detection circuit 11 detects a start-code then the timing of WSS is assumed to be estimated and a "WSS line 23 detected" signal WSS23 is produced. Since we have knowledge about the relative position of the data referred to the start-code, we have now an estimate of the timing of the WSS data. The WSS data estimation process is now activated. How this estimation is done will be explained in detail below. The output of the WSS data estimator 13 will be 14 data bits and 14 corresponding violation flags. When a violation flag is set, it means that the corresponding data bit might be unreliable. FIG. 11 shows, under the headings "group 1" to "group 4", one example for the significance which can be assigned to the 14 data bits 0 through 13.

The 14 data bits and 14 violation flags are stored into a buffer 15 and can be addressed by the outer world, a TV-set, via IIC communication. Now, within the TV-set, the WSS data can be evaluated and further processed. The violation flags are used as a means to gain knowledge about the reliability of the input WSS signal in order to determine a strategy for further processing.

Figure 4:
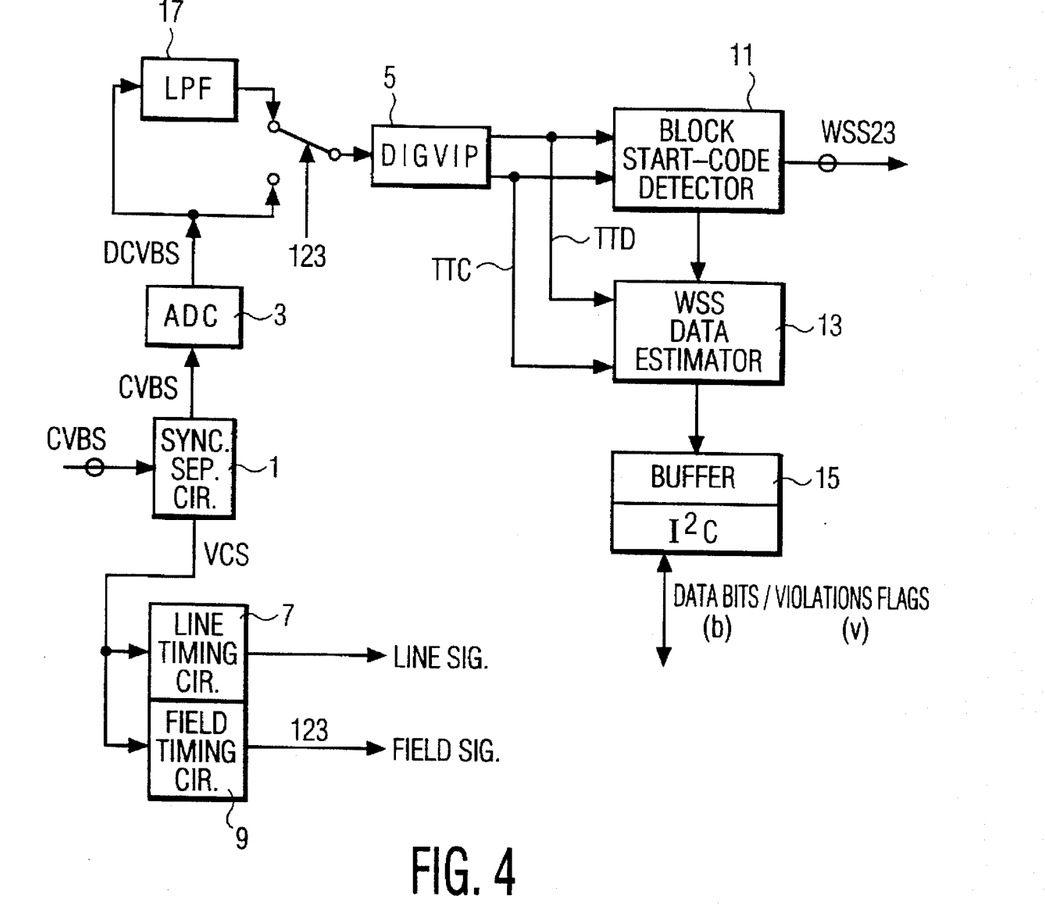
Figure 5:
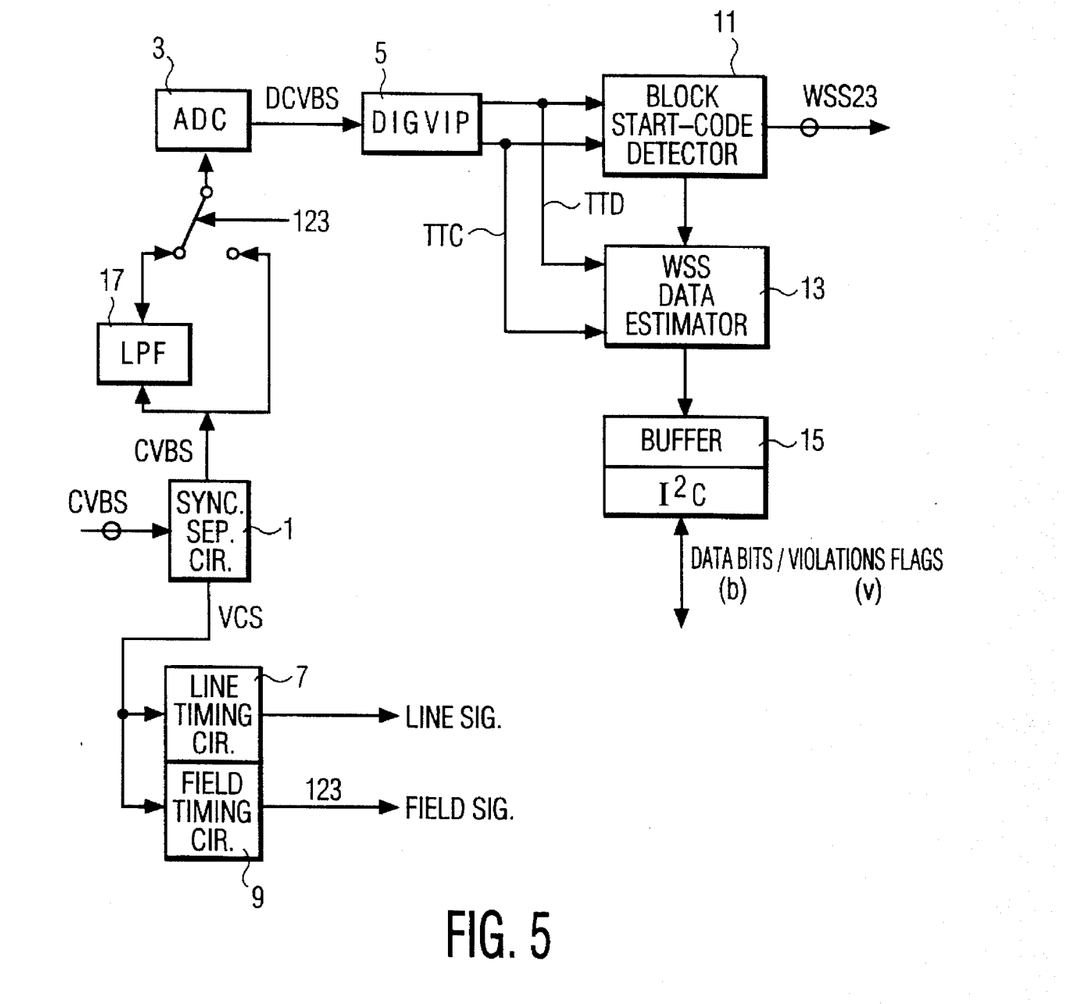

In FIGS. 4, 5, alternative WSS-decoder circuits are presented. The main difference is the inclusion of a decoder low-pass input filter 17. In FIG. 4, it is a digital filter between the ADC 3 and the DIGVIP 5, and in FIG. 5 it is an analog filter between the input clamp and sync separation circuit I and the ADC 3. In both cases, a switch controlled by the line 23 signal 123 applies the output of the LPF 17 or its input to the circuit (DIGVIP 5 in FIG. 4, ADC 3 in FIG. 5) which follows the LPF 17. The digital filter (FIG. 4) has preferably a [1 2 2 1] or [2 3 4 4 3 2] impulse response at 13.5 MHz sample frequency because of a number of reasons:

An amplitude response which is a close copy of the frequency domain representation of the elementary pulse which is used at the WSS-encoder. This use is understood to mean that in the encoder, the Wide Screen Signalling bit stream is low-pass filtered by means of a low-pass filter having an amplitude response corresponding to the frequency domain representation of the elementary pulse. The used elementary pulse EP can be described by the formula $EP=\cos^2(\pi/2*t/(200 \text{ ns}))$ when $-200 \text{ ns} \leq t \leq +200 \text{ ns}$, and $EP=0$ elsewhere.

A spectral null at or in the direct neighborhood of the color subcarrier. Explanation: some VCR's average color information over two lines so that color subcarrier might leak into line 23. Suppression of color subcarrier by a WSS-decoder input filter is therefore wanted if VCR signals are going to be its input.

A [1 2 2 1] digital filter meets these demands quite closely. Such a filter gives a noise power suppression of more than 4 dB unweighed in the PAL vision bandwidth of 5 MHz. The [2 3 4 4 3 2] filter is more complex, has a steeper roll-off and is useful as a compromise if the WSS data bits are hard decoded instead of soft decoded. For an explanation as to the notions soft and hard decoding, reference is made to J. G. Proakis, Digital communications, second edition, McGraw-Hill Book Co, 1989. Both digital filters have a spectral null at 4.5 MHz which is sufficiently close enough to the color subcarrier frequency $f_{sc}$ 32 4.43361875 MHz.

If an implementation is chosen which includes an analog low-pass WSS-decoder input filter 17 (see FIG. 5), then its response should either be that of the elementary pulse of the WSS-encoder combined, if necessary, with a notch at the color subcarrier frequency, or look like the amplitude response of a [2 3 4 4 3 2] digital filter with a sample frequency of 13.5 MHz. An advantage of an analog filter might be that it can be put outside the teletext and WSS bits decoder IC.

THE START-CODE DETECTION PROCESS

The process of start-code detection is presented in successive order by the following items:

The vertical and horizontal sync in CVBS control the process of finding line 23. This part is taken care of by the field timing circuit 9.

Line 23 has been found. From the horizontal sync, the line timing circuit 7 generates a time window which enables the search for the start code of wide screen signalling. This window has a timing tolerance of at least ±4 µs. Hence, this window has at least a duration of 14 µs, as the combination of the start code and the run-in tail lasts 6 µs.

During the time that the start code window is active, the start code is searched in real time. In one embodiment, a start code is said to be detected whenever the following two criteria are both met (see FIG. 6):

All 14 a priori selected bits from the start code and run-in tail must be correct.

From 5 a priori selected start code bit pairs and 1 bit pair at the transition of start code and run-in, minimal n pairs must be free from error. Those bit pairs that are not correct should not have both bits inverted. This number n is a predetermined value; $n \in \{0, 1, \ldots, 6\}$. Good choices appeared to be n=4 or n=5.

As soon as the criteria for start-code detection are met, the process of start code search is halted. Now, the timing of the wide screen signalling information has been estimated.

Figure 6:
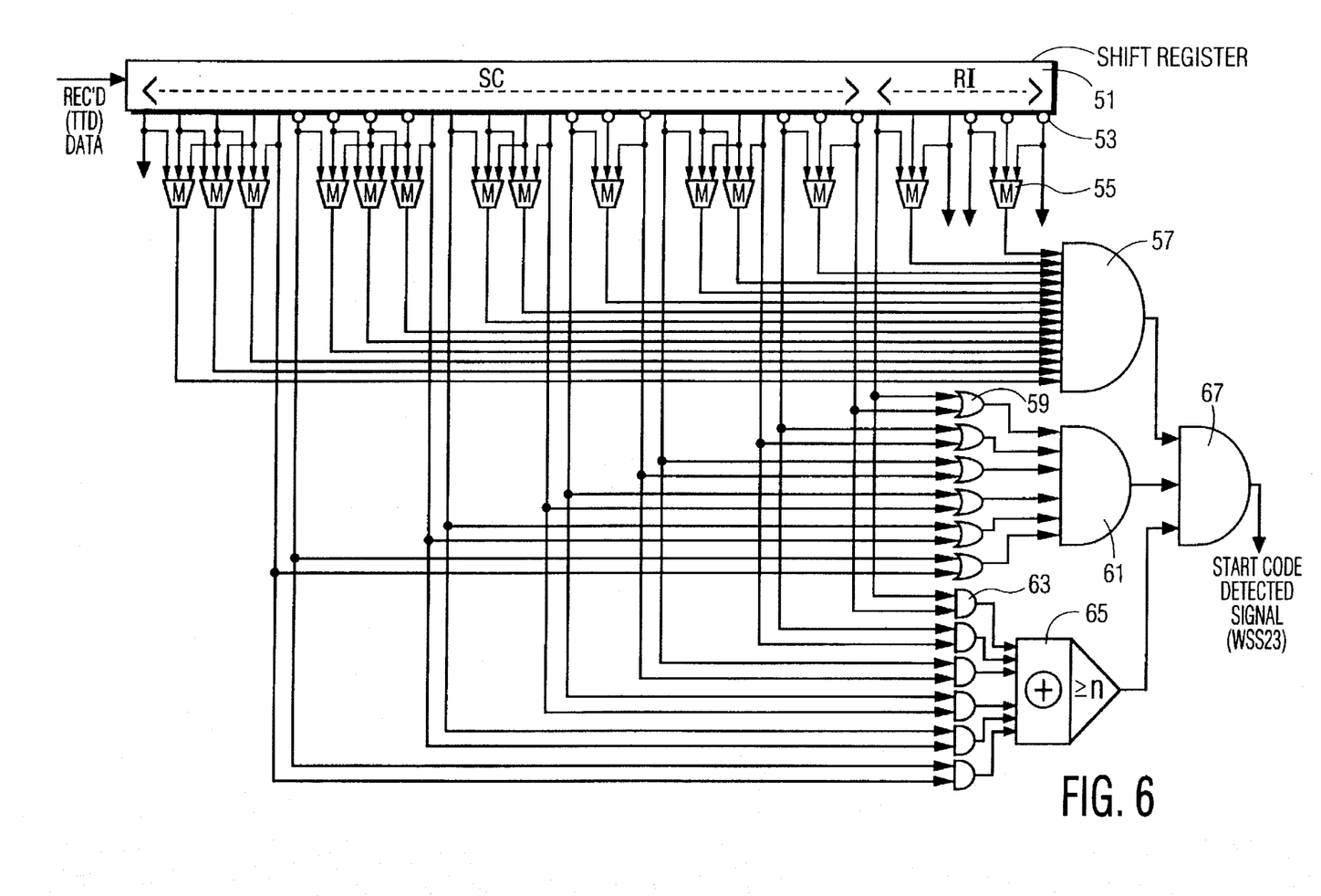
FIG. 6 shows a block diagram of start code detection.

FIG. 6 shows a block diagram of a start code detector. The received data is shifted into a shift register 51. As both the tail of the run-in RI and the start code SC are known, it is possible to provide all shift register outputs, which are supposed to supply zero bits in case of a correct reception, with inverters (indicated by small circles 53). Taking these inverters 53 into account, all output signals should be logical "1". Preferably, like outputs are filtered by 14 small filters 55 which furnish the left-hand input signal if the left-hand and right-hand input signals are equal, and which furnish the middle input signal otherwise. The outputs of the 14 filters 55 are applied to a logical AND circuit 57 which supplies a logical "1" in case of a correct reception of the start code SC and the run-in tail RI. The 14 filters 55 could be omitted after appropriate low-pass pre-filtering, in which case, the middle input bit of each filter would be applied to the logical AND circuit 57. These middle bits are believed to show a good detection reliability even under bad reception conditions (for example, after recording on a VCR which, inter alia, results in a low-pass "filtering" of the signal) because their respective left and right adjacent bits should have the same value upon correct reception.

The start code detector of FIG. 6 further checks the zero-one and one-zero transition bit pairs in the start code SC by applying the transition bit pairs to logical OR circuits 59 whose outputs are applied to inputs of a logical AND circuit 61. Again, in case of a correct reception of the start code, the logical AND circuit 61 supplies a logical "1".

To increase the detection quality even further, the same six start code transition bit pairs are applied to logical AND circuits 63, whose outputs are applied to a logical circuit 65 which furnishes a logical "1" if at least n of the output signals of the logical AND circuits 63 are logical "1". If, in at least one of the transition bit pairs, both bits are inverted, the corresponding OR circuit will furnish a logical "0" to the AND circuit 61 which will thus also furnish a logical "0" output signal.

Finally, a logical AND circuit 67 receives the outputs of the logical circuits 57, 61 and 65 and furnishes a "start code detected" signal if all outputs are logical "1".

If no start code is detected, no line 23 detection signal is generated and further WSS processing in the present frame is halted. In the other case, a line 23 detection signal is generated and the WSS data can be estimated.

DATA AND DATA RELIABILITY ESTIMATION

Figure 7:
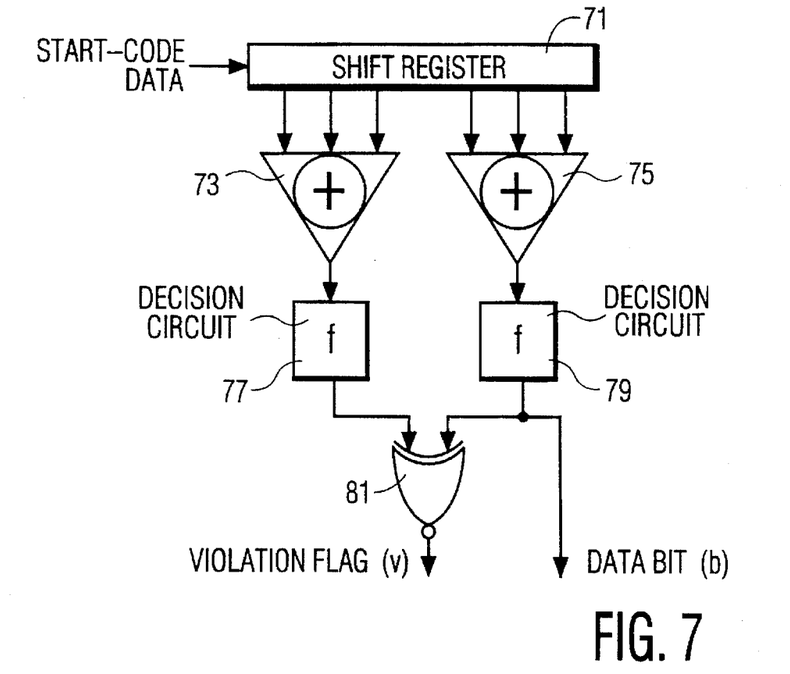
FIG. 7 shows a block diagram of a first data bit estimator embodiment.

Let's assume that the start-code has been detected. Now we have an estimate of the timing of the start code, we also have an estimate of the location of the data. The 14 data bits can now be estimated. Each data bit includes 6 hard sliced samples. Therefore no soft decision decoding is possible (see the above-mentioned book of Proakis). The first 3 samples should be the inverse of the second 3 samples. The estimation process of the data is presented in FIG. 7 and is the following. Take the first 3 samples of the 6 samples present in a shift register 71. A counter 75 counts the number of ones. If the number of ones is equal or greater than 2, a decision circuit 79 decides that the data bit b is "1"; in the other case, the decision circuit 79 decides that a "0" has been received. Repeat the same procedure for the second 3 samples by means of a counter 73 and a decision circuit 77. The results of the decision circuits 77, 79 are compared by a logical NOT-EX-OR circuit 81. If the results are each other's inverse then the data estimate b is reliable, else not. The data reliability is signalled by violation flags v; each data bit b has its own reliability flag v. This process is executed 14 times.

Figure 8:
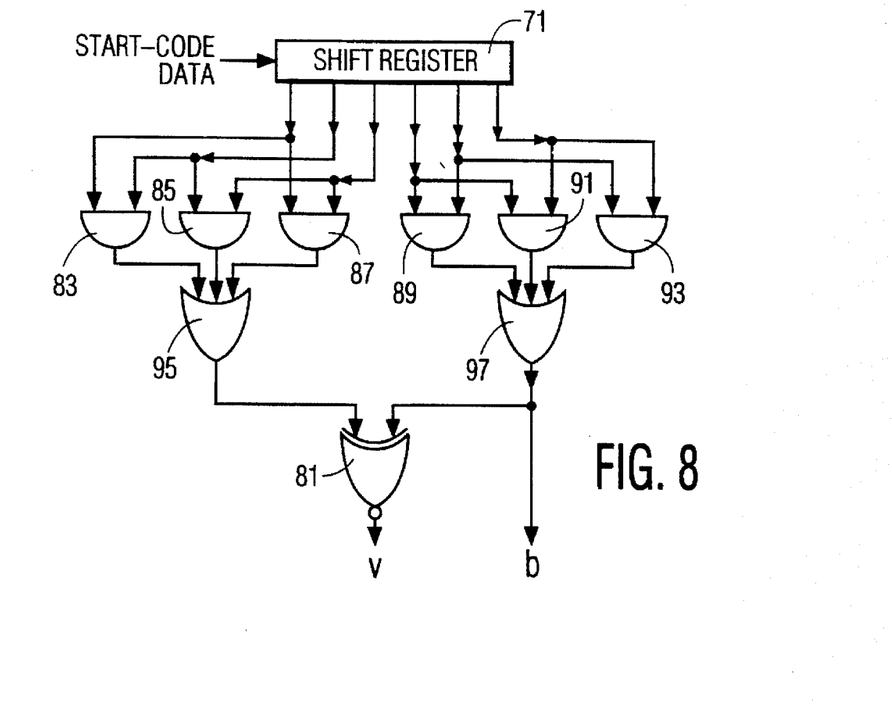
FIG. 8 shows a block diagram of a second data bit estimator embodiment.

An alternative data bit estimator is shown in FIG. 8. The first and second output samples of the shift register 71 are applied to a logical AND circuit 83, the second and third output samples to an AND 85, and the first and third output samples to an AND 87. The fourth and fifth output samples of the shift register 71 are applied to a logical AND circuit 89, the fifth and sixth output samples to an AND 91, and the fourth and sixth output samples to an AND 93. The outputs of the ANDs 83–87 are applied to a logical OR circuit 95, and the outputs of the ANDs 89–93 are applied to a logical OR circuit 97. The OR 97 furnishes the data bit b. The outputs of the ORs 95 and 97 are applied to the logical NOT-EX-OR circuit 81 to obtain the corresponding violation flag v.

DATA TRANSFER

The 14 data bits and their corresponding violation flags are put into a buffer. The outer world can access this data in the buffer via IIC communication. Further processing has already been mentioned above.

PROPOSAL FOR WIDE SCREEN SIGNALLING BITS

For a smooth introduction of new television services with a 16:9 display aspect ratio in PAL and SECAM standards, it is necessary to signal the aspect ratio used together with some switching information to the television receiver. The receiver should be capable of reacting automatically to this information by displaying the video information in a specified aspect ratio. This signalling is to be considered separately from the type of system used, but it should allow transmission of system related switching information as well.

The proposed standard leaves room for the later allocation of additional switching information, related to the introduction of enhanced television services. The proposed standard is applicable for 625 line PAL and SECAM television systems, but there is potential to adopt it to other standards as well.

This proposal is applicable to 625 line PAL and SECAM systems in use, in case where wide-screen signalling is required by the broadcasters. It specifies the wide screen signalling information, the coding and the way of incorporating the coded information into a 625 line system. The wide screen signalling information contains information on the aspect ratio range of the transmitted signal and its position, on the position of the subtitles and on the camera/ film mode. Furthermore some bits are reserved for future EDTV signalling (e.g. PALplus) as well as for future use.

This proposal specifies the transmitted signal. An annex gives the rules of operation for the minimum requirements for receiver display formats as well as for subtitling.

For the purpose of this standard the following definition shall apply: Letterbox operation is the use of a picture format with an aspect ratio greater than 1.33, in such a way that empty (black) lines are added to conform to a 4:3 transmission format.

| Symbols and Abbreviations | |
|---|---|
| TXT: | Teletext |
| Fs: | clock frequency |
| Ts: | sampling period |
| Td: | data bit period |
| a: | Aspect ratio |

Figure 9:
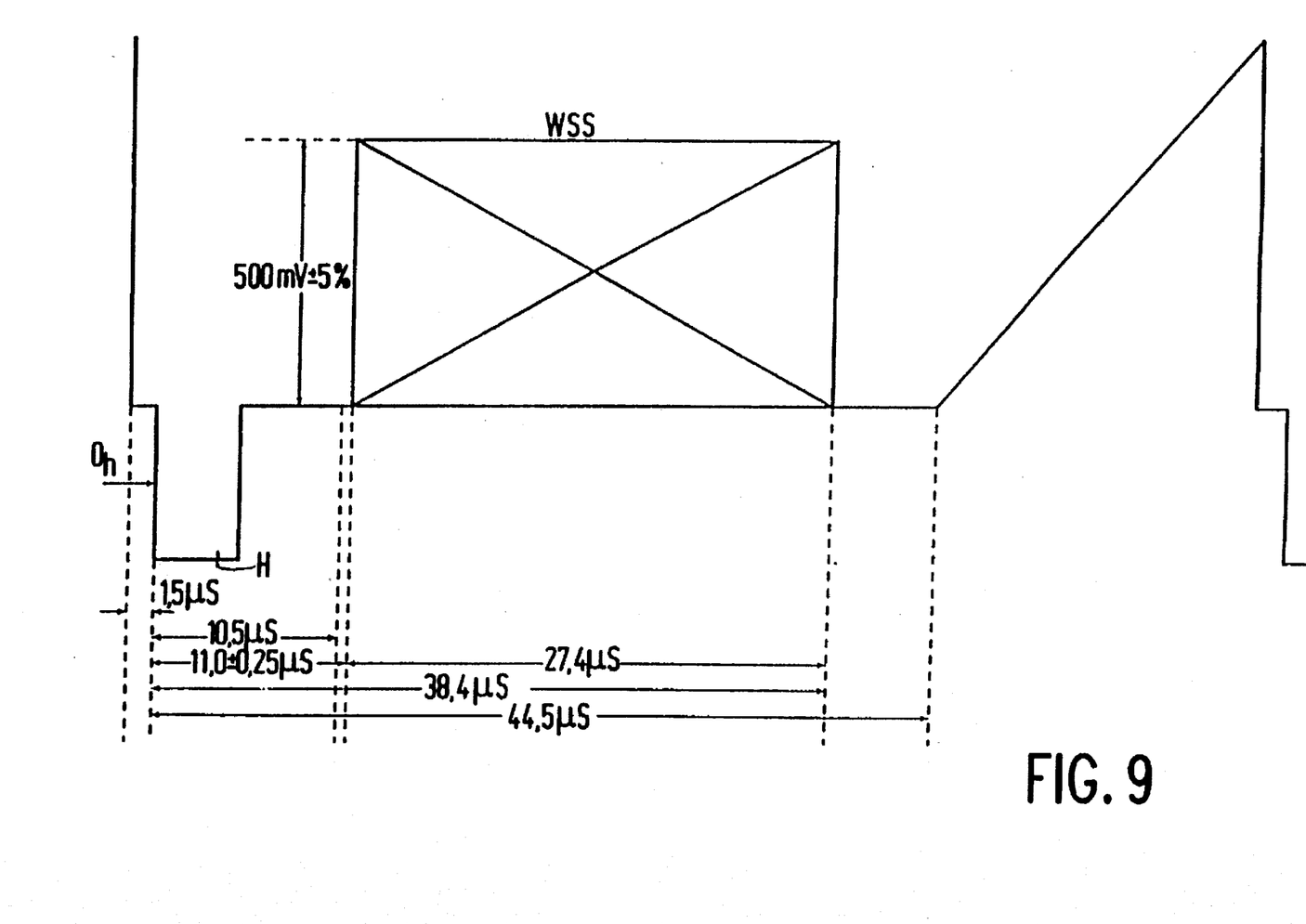
FIG. 9 shows the position of the Wide Screen Signalling bits in line 23.

This paragraph specifies the line code of the wide-screen signalling. The signalling bits are transmitted as a data burst in the first part of line 23. The position of the beginning of the wide screen signalling bits WSS is 11.0±0.25 µs from Oh of the horizontal sync pulse H, as indicated in FIG. 9. In each frame line 23 shall be occupied with the wide screen signalling.

The clock frequency is: Fs=5 MHz ($\pm 1*10^{-4}$)
The sample period is: Ts=200 ns
The signal shape is approximately a sine squared pulse.
The half amplitude pulse duration is: 200 ns ±10 ns.
The signal amplitude with respect to a maximum video signal amplitude of 700 mV is: 500 mV ±5%

Figure 10A:
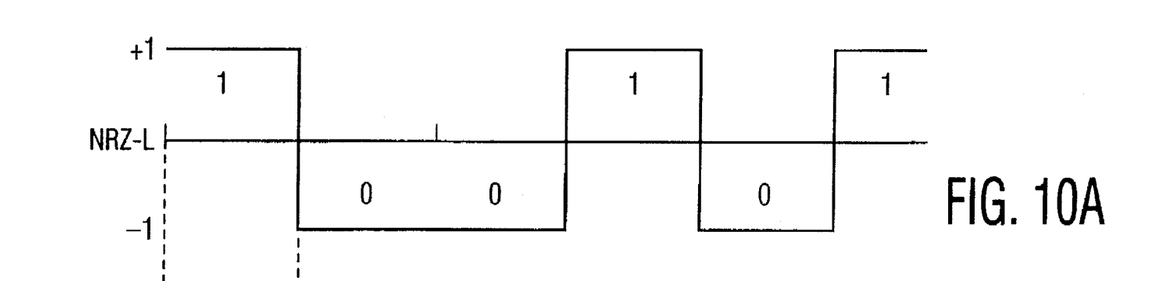
FIG. 10 shows an example of bi-phase-L modulation coding.
Figures 10B, 10C:
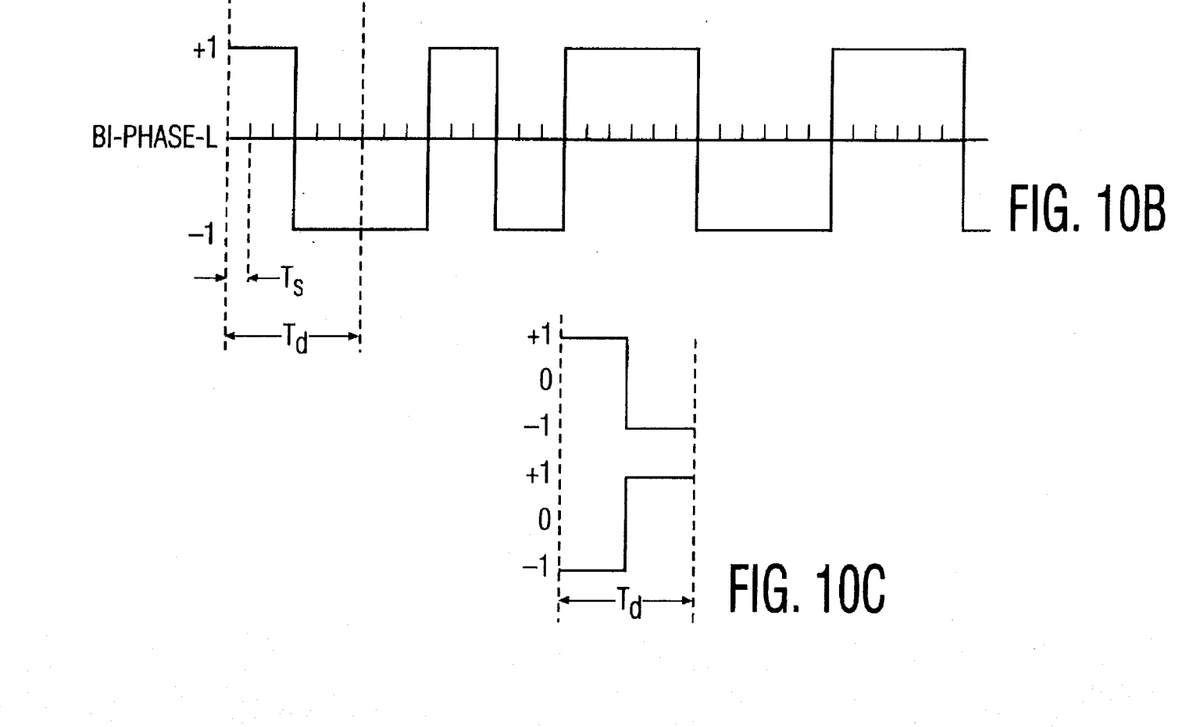

The type of modulation coding is hi-phase modulation coding according to FIG. 10. The duration of one data bit equals Td. The data bits are inserted in NRZ-L, in which one data bit period equals 2 times 3 clock periods: Td=6 Ts.

The preamble contains a run-in and a start code. The preamble is given in the wide screen signalling bits transmission scheme table shown in FIGS. 11a–11c. There are 14 bits in total. One out of these 14 bits is allocated to the error detection code. There are 13 data-bits available for transmission of information. The data bits are grouped in 4 data groups, see the table shown in FIGS. 11a–11c. For error detection, an odd parity bit has been introduced. The odd parity bit belongs to the first 3 data bits only.

The 13 data carrying bits are grouped in 4 groups. Group 1 contains 4 bits in which the first 3 bits carry data and the last bit denotes the odd parity bit over the first three data bits. Group 2 contains 4 data bits, group 3 contains 3 data bits and group 4 contains 3 data bits.

Figure 11A:
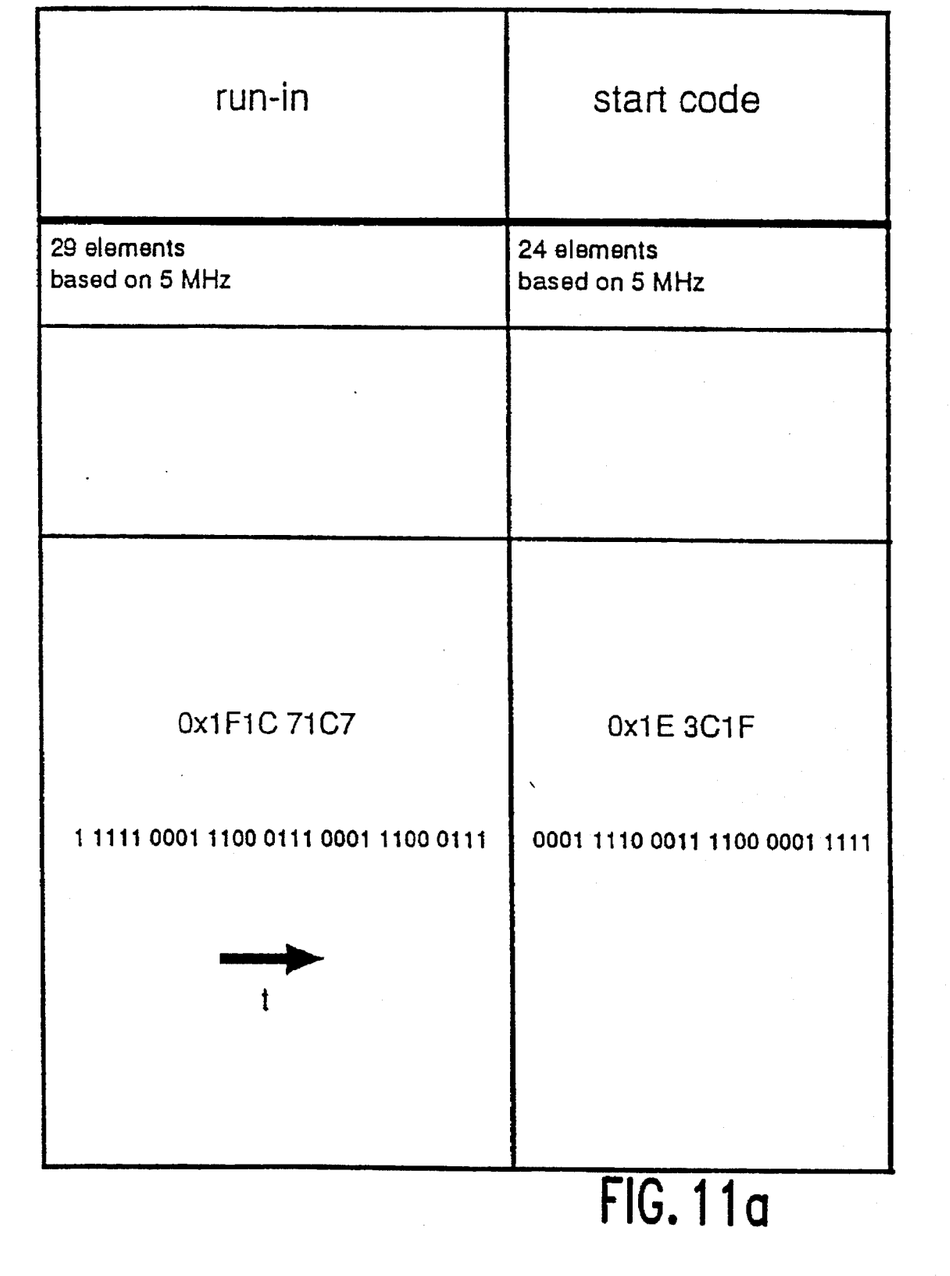
Figure 11B:
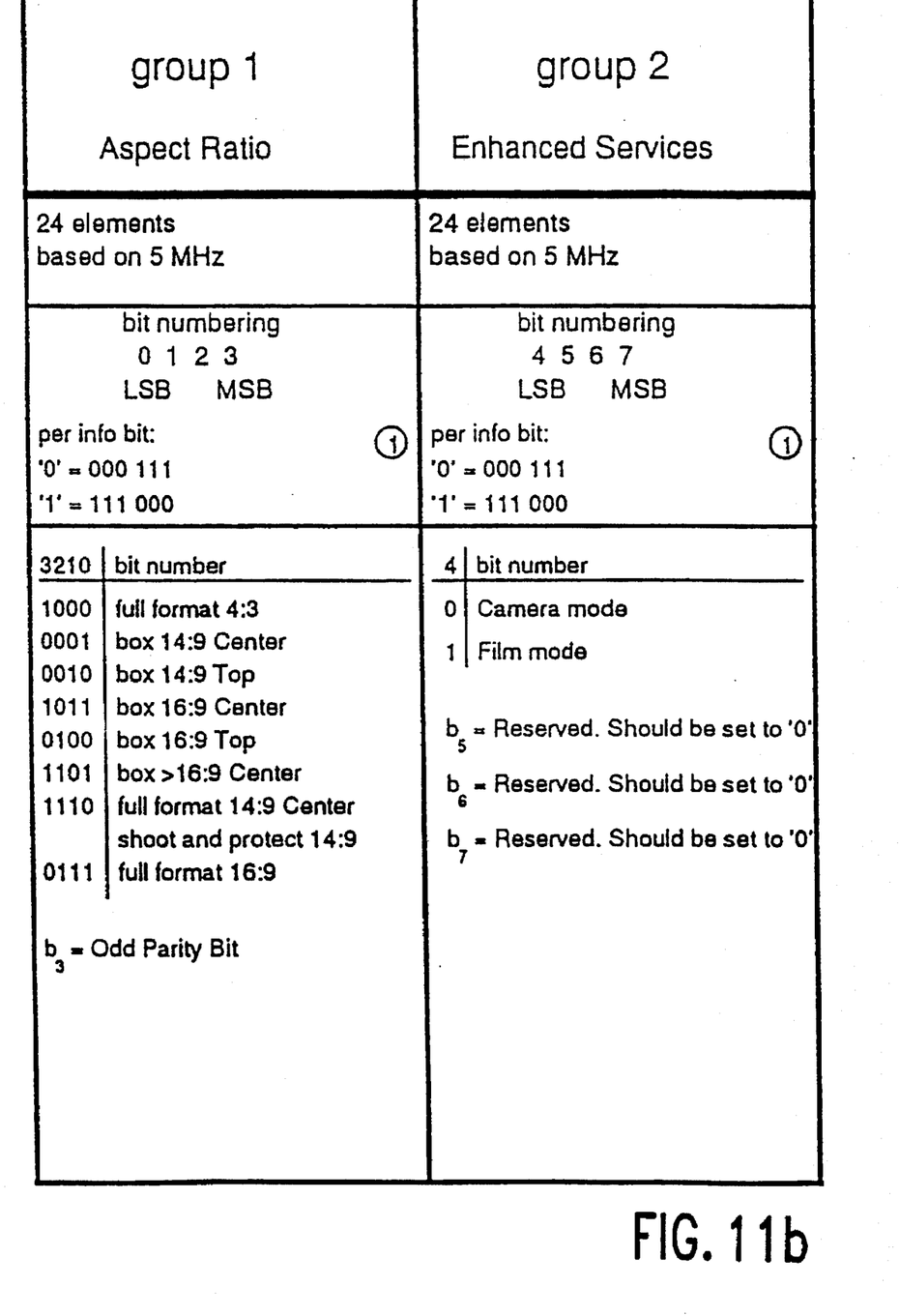
Figure 11C:
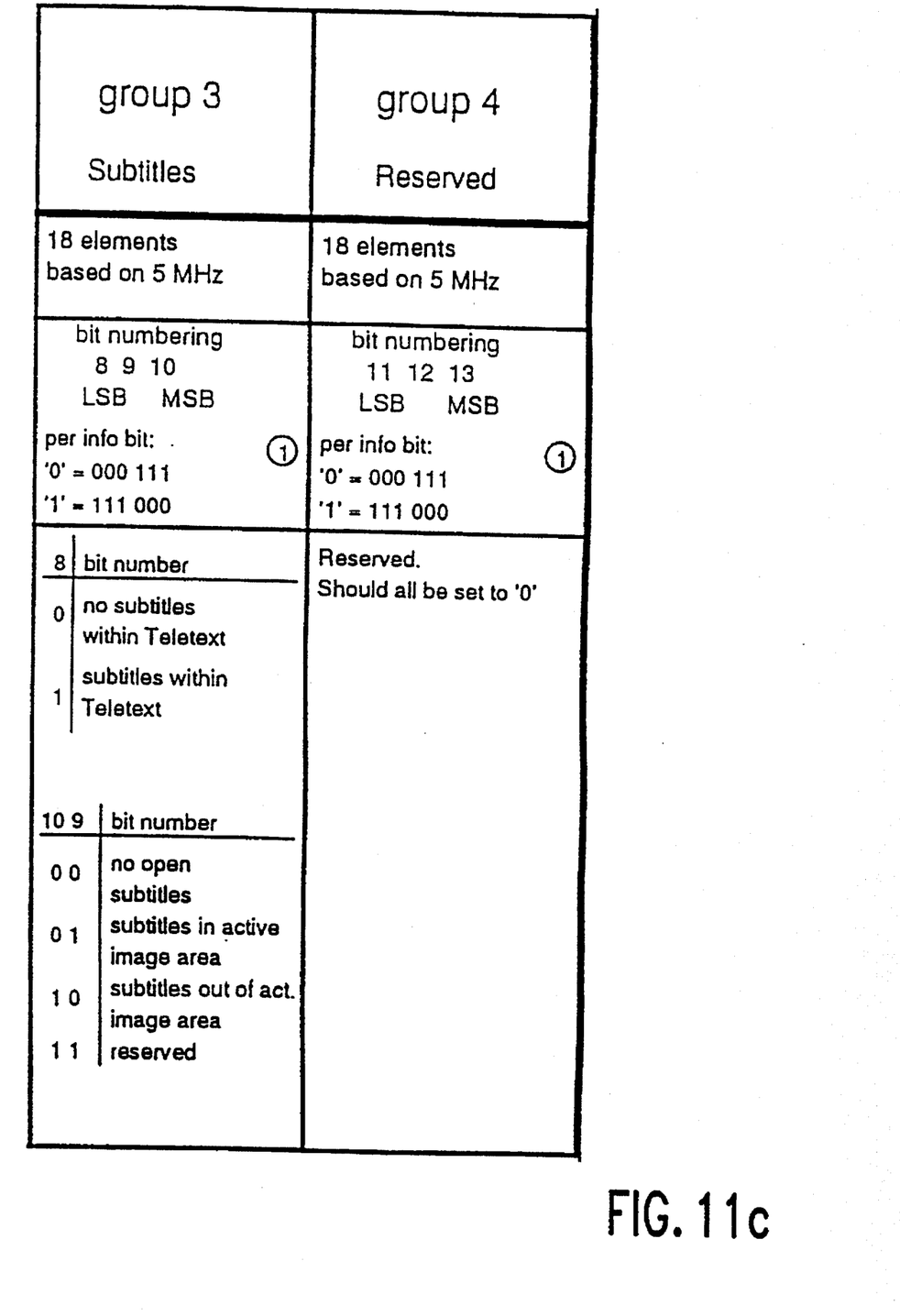

The data bits are labelled $b_0$ up to and including $b_2$, and $b_4$ up to and including $b_{13}$. Bit $b_3$ is the odd parity bit as is shown in FIGS. 11a–11c and Table 1. The index also indicates the order of transmission: i.e. $b_0$, is the first transmitted bit.

DATA GROUP 1, ASPECT RATIO

Bits $b_0$, $b_1$, $b_2$ denote the aspect ratio label, the letterbox format and position according to Table 1. Bit $b_3$ denotes odd parity of bits $b_0$, $b_1$, $b_2$, $b_3$ according to Table 1.

TABLE 1

| Aspect ratio label, letterbox and position code | | | | | |
|---|---|---|---|---|---|
| $b_3$ | $b_2 b_1 b_0$ | Aspect ratio label | Full format or Letterbox | Position | No. of active lines (1) |
| 1 | 000 | 4:3 | full format | not applicable | 576 |
| 0 | 001 | 14:9 | letterbox | center | 504 |
| 0 | 010 | 14:9 | letterbox | top | 504 |
| 1 | 011 | 16:9 | letterbox | center | 430 |
| 0 | 100 | 16:9 | letterbox | top | 430 |
| 1 | 101 | >16:9 | letterbox | center | not defined |
| 1 | 110 | 14:9 | full format (2) | center | 576 |
| 0 | 111 | 16:9 | full format (anamorphic) | not applicable | 576 |

Note (1): The number of active lines is only an indication for the exact aspect ratio a = 1.33, a = 1.57 and a = 1.78.

Note (2): The actual transmitted aspect ratio is 4:3, but a 14:9 window should contain all the relevant picture content to encourage a wide screen display on a 16:9 television set.

The aspect ratio label indicates a range of possible aspect ratio. All aspect ratio's falling in these ranges are labelled by the same code. Table 2 indicates the aspect ratio ranges.

TABLE 2

| Aspect ratio ranges | |
|---|---|
| Aspect ratio label | Aspect ratio range |
| 4:3 | a ≦ 1.46 |
| 14:9 | 1.46 < a ≦ 1.66 |
| 16:9 | 1.66 < a ≦ 1.90 |
| >16:9 | a > 1.90 |

DATA GROUP 2, ENHANCED SERVICES

Bit $b_4$ denotes the film bit in accordance with table 3.

TABLE 3

| Film bit | |
|---|---|
| $b_4$ | Film bit |
| 0 | camera mode |
| 1 | film mode (3) |

Note (3): The field dominance conforms to the EBU Recommendation R62-1990, entitled: "Recommendation dominant field for 625-line 50 Hz processing".

Bits $b_5$, $b_6$ and $b_7$ are reserved. Should all be set to '0'.

DATA GROUP 3, SUBTITLES

Bit $b_8$ denotes the subtitles within Teletext bit in accordance with table 4.

TABLE 4

| Subtitles within Teletext bit | |
|---|---|
| $b_8$ | Subtitles within Teletext bit |
| 0 | no subtitles within Teletext |
| 1 | subtitles within Teletext |

SUBTITLING MODE

Bits $b_9$, $b_{10}$ denote the subtitling mode in accordance with table 5.

TABLE 5

| $b_{10}, b_9$ | Subtitling mode Subtitles in/out of active image area |
|---|---|
| 00 | no open subtitles |
| 01 | subtitles in active image area |
| 10 | subtitles out of active image area |
| 11 | reserved |

Note: the 'out of active image area' subtitling, which extends into the active image area, shall be treated as 'out of active image area'.

Figure 12A:
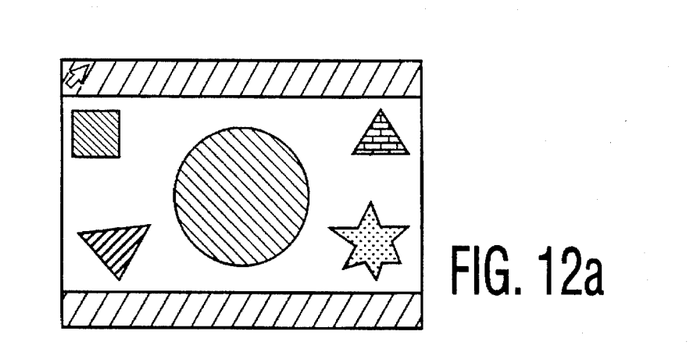
FIGS. 12a and 12b show examples of letterbox signals with logos and subtitling.
Figure 12B:
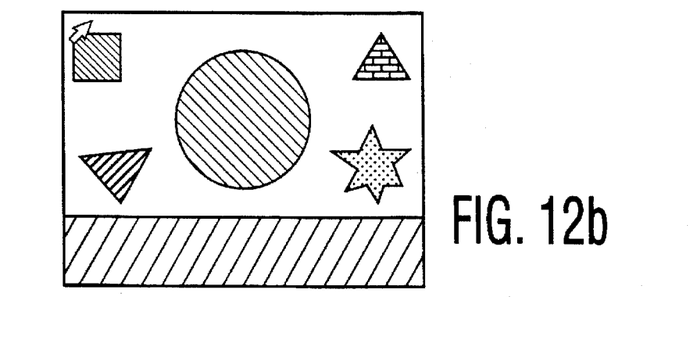

FIGS. 12a and 12b indicate the meaning of the terms 'in active image area' and 'out of active image area'. If the subtitle is within the white center part of the letterbox picture, the subtitle is within the active image area. If the subtitles are in the black bars of the letterbox picture, the subtitle is out of the active image area. FIG. 12a illustrates the letterbox center mode, while FIG. 12b illustrates the letterbox top mode. Logos may be positioned in the upper left corner as indicated by the arrows.

DATA GROUP 4, RESERVED

Bits $b_{11}$, $b_{12}$, $b_{13}$ are reserved. Should all be set to '0'.

ANNEX A—RULES OF OPERATION (INFORMATIVE)

A1—RECEIVER DISPLAY FORMATS

To ensure automatic selection of the most appropriate display mode, the receiver with a 16:9 display should comply with the following minimum requirements:

TABLE A1

| $b_2 b_1 b_0$ | Aspect ratio minimum requirements Aspect ratio label | Minimum Requirements |
|---|---|---|
| 000 | 4:3 | case 1 |
| 001 | 14:9 | case 2 |
| 010 | 14:9 | case 2 |
| 011 | 16:9 | case 3 |
| 100 | 16:9 | case 3 |
| 101 | >16:9 | case 4 |

Case 1: 4:3 full format: The 4:3 aspect ratio picture should be displayed centred with black bars at the left and right hand side of the display.
Case 2: Letterbox signalled as 14:9: the 14:9 aspect ratio picture should be displayed using one of the following two methods: a) the 14:9 aspect ratio picture shall be displayed centered with small bars at the left and right hand sides of the display; b) the 14:9 picture may be displayed filling the full width of the visible screen by incorporating a small horizontal geometrical error - typically 8%.
Case 3: Letterbox signalled as 16:9: the 16:9 aspect ratio picture should be displayed using the full width of the screen.
Case 4: Letterbox signalled as >16:9: the >16:9 aspect ratio picture should be displayed using one of the following two methods: a) as under Case 3; b) the >16:9 picture may be displayed using the full height of the screen, by further zooming in.

It should be noted that the viewer should be free to override the automatically selected display condition. The speed of the automatic change of aspect ratio is limited mainly by the response time of the deflection circuit.

A2—SUBTITLING

When the subtitling of letterboxed pictures is in the 'out-of active image area', even when partly, the new 16:9 receivers will loose this information, unless they display the picture in the 4:3 mode. This would mean that on the 16:9 receiver black bars would be present all around the active image content and this is to be avoided.

To serve both the interests of the existing 4:3 and the new 16:9 viewers, it is of great importance, that wide screen programs should always have the subtitling (whether 'in active image area' or 'out of active image area') conveyed as well by means of the Teletext service, and that new 16:9 receivers, complying with this standard, should be equipped with a Teletext decoder and always have the possibility of detecting the Teletext presence bit $b_8$.

A3—PROCEDURE IN ABSENCE OF SIGNALLING

In the absence of signalling bits, the receiver should go to a default mode.

ANNEX B—RECOMMENDATIONS

B1—LOW-PASS PRF-FILTERING

It is recommended that the received wide screen signalling bits are low-pass filtered before decoding. This low-pass filter should preserve the main spectral energy of the wide screen signalling bits signal, which resided in the spectral domain of 0 MHz up to 1.67 MHz.

B2—RESPONSE TIME ON A CHANGE IN THE RECEIVED SIGNALLING INFORMATION

The maximum response time on a change in the received signalling bits information is recommended to be 120 ms.

It should be noted that the above-mentioned embodiments illustrate rather than limit the invention, and that those skilled in the art will be able to design many alternative embodiments without departing from the scope of the appended claims.

We claim:

1. A method for encoding an extended television signal comprising the steps:

generating signalling bits for conveying control information to control an extended decoder;

inserting the signalling bits into an extended television signal; and providing said extended television signal with said signalling bits for transmission;

wherein the signalling bits comprise a start code and data bits, the start code having a main lobe of spectral energy residing in a lower spectral area of a baseband television signal, said lower spectral area having a maximum frequency below 2 MHz, the start code having an amplitude dip at zero frequency, and the start code having minimum predetermined aperiodic correlation properties and a predetermined minimum bit Hamming distance to the data bits when shifted in the direction of the data bits following the start code.

2. A method for encoding an extended television signal as claimed in claim 1, wherein the start code has an amplitude dip at said maximum frequency.

3. A method for encoding an extended television signal as claimed in claim 1, wherein the signalling bits further comprise a run-in preceding the start code, and the start code has a predetermined minimum bit Hamming distance to the run-in when shifted in the direction of the run-in.

4. A method for encoding an extended television signal as claimed in claim 1, wherein the signalling bits further comprise a run-in preceding the start code, wherein the start code is based on a bit sequence of a first length and has a first minimum bit Hamming distance to said run-in, and wherein the combination of a last part of the run-in together with the start code is based on a bit sequence of a second length exceeding said first length, said combination having a second minimum bit Hamming distance to said run-in, and said second minimum bit Hamming distance exceeding said first minimum bit Hamming distance.

5. A method for encoding an extended television signal as claimed in claim 4, wherein the start code has a third minimum bit Hamming distance to said data bits, and wherein said combination has a fourth minimum bit Hamming distance to said data bits, said fourth minimum bit Hamming distance exceeding said third minimum bit Hamming distance.

6. A method for encoding an extended television signal as claimed in claim 1, wherein the start code is based on a Barker sequence of a first length, and wherein the signalling bits further comprise a run-in preceding the start code, the combination of a last part of the run-in together with the start code being based on a Barker sequence of a second length exceeding said first length.

7. A method for encoding an extended television signal as claimed in claim 1, wherein the start code includes a sequence being code modulated in a manner deviating from the code modulation of the data bits.

8. A method for encoding an extended television signal as claimed in claim 7, wherein said sequence is (1E 3C1F) in hexadecimal notation.

9. A method for encoding an extended television signal as claimed in claim 8, wherein the signalling bits further comprise a run-in whose last bits are (000111) in binary notation.

10. A method for encoding an extended television signal as claimed in claim 1, wherein the signalling bits further comprise a run-in having at least eight transients.

11. An extended television signal decoder, comprising:
 means coupled to receive an extended television signal comprising image data, signalling bits for conveying control information to control processing operations with regard to said image data, and synchronizing information, for deriving said synchronizing information from said extended television signal;
 means coupled to receive said synchronizing information for selecting a signalling bits window;
 means coupled to receive said extended television signal for decoding said signalling bits during said signalling bits window;
 wherein the signalling bits comprise a start code and data bits, and wherein the start code's main lobe of spectral energy resides in the lower spectral area of a baseband television signal, said lower spectral area having a maximum frequency below 2 MHz, the start code having a local spectral minimum at DC, and the start code having predetermined minimum aperiodic correlation properties and a predetermined minimum bit Hamming distance to the data bits when shifted towards or over the data bits following the start code.

12. An extended television decoder as claimed in claim 11, wherein said signalling bits decoding means is preceded by a low-pass filter having a cut-off frequency at said maximum frequency.

13. An extended television decoder as claimed in claim 11, wherein said signalling bits decoding means is preceded by a low-pass filter having a spectral minimum at the color subcarrier frequency and an impulse response approximating a frequency domain representation of an elementary pulse $EP=\cos^2(\pi/2*t/(200\ ns))$ when $-200\ ns \leq t \leq +200\ ns$, and $EP=0$ elsewhere.

14. An extended television decoder as claimed in claim 11, wherein said signalling bits decoding means (5, 11, 13) are preceded by a low-pass filter having a (1 2 2 1) or (2 3 4 4 3 2) impulse response at a 13.5 MHz sample rate.

15. An extended television decoder as claimed in claim 11, wherein said signalling bits decoding means comprises a start code detector operative during a start code timing window having a timing tolerance of at least ±4 μs.

16. An extended television decoder as claimed in claim 11, wherein said signalling bits further comprise a run-in preceding said start code, and said signalling bits decoding means comprises a start code detector arranged for detecting a combination of said start code and a last part of said run-in.

17. An extended television decoder as claimed in claim 11, wherein said signalling bits decoding means comprises a start code detector arranged for detecting a start code sequence which is (1E 3C1F) in hexadecimal notation.

18. An extended television decoder as claimed in claim 11, wherein said signalling bits decoding means comprises a start code detector comprising:
 means for determining whether a first plurality of bits has been correctly received;
 means for determining whether, among a second plurality of bits, at least a predetermined number of bits is free from error.

19. An extended television decoder as claimed in claim 11, wherein said start code detector further comprises:
 means for determining whether said second plurality of bits contains a bit pair around a transient, both bits of said bit pair being inverted.

20. A method of decoding an extended television signal, comprising the steps of:
 receiving an extended television signal comprising image data, signalling bits for conveying control information to control processing operations with regard to said image data, and synchronizing information, for deriving said synchronizing information from said extended television signal;
 selecting a signalling bits window in dependence on said synchronizing information;
 decoding said signalling bits during said signalling bits window in response to said extended television signal;
 wherein the signalling bits comprise a start code and data bits, the start code's main lobe of spectral energy residing in the lower spectral area of a baseband television signal, said lower spectral area having a maximum frequency below 2 MHz, the start code having a local spectral minimum at DC, and the start code having predetermined minimum aperiodic correlation properties and a predetermined minimum bit Hamming distance to the data bits when shifted towards or over the data bits following the start code.

21. A method for encoding an extended television signal as claimed in claim 1, wherein the maximum frequency of the lower spectral area equals 1.7 MHz.

22. A method for encoding an extended television signal as claimed in claim 1, wherein said minimum predetermined aperiodic correlation properties comprises the aperiodic correlation of the start code, normalized to a global maximum of one at zero delay, showing a difference of at least one-half between the global maximum and any local maxima.

23. An extended television decoder as claimed in claim 11, wherein the maximum frequency of the lower spectral area equals 1.7 MHz.

24. An extended television decoder as claimed in claim 11, wherein said minimum predetermined aperiodic correlation properties comprises the aperiodic correlation of the start code, normalized to a global maximum of one at zero delay, showing a difference of at least one-half between the global maximum and any local maxima.

25. A method of decoding an extended television signal as claimed in claim 20, wherein the maximum frequency of the lower spectral area equals 1.7 MHz.

26. A method of decoding an extended television signal as claimed in claim 20, wherein said minimum predetermined aperiodic correlation properties comprises the aperiodic correlation of the start code, normalized to a global maximum of one at zero delay, showing a difference of at least one-half between the global maximum and any local maxima.

* * * * *